United States Patent [19]
Roberts

[11] Patent Number: 6,034,467
[45] Date of Patent: Mar. 7, 2000

[54] COMPACT HEAT SINKS FOR COOLING ARC LAMPS

[75] Inventor: Roy D. Roberts, Newark, Calif.

[73] Assignee: ILC Technology, Inc., Sunnyvale, Calif.

[21] Appl. No.: 08/421,387

[22] Filed: Apr. 13, 1995

[51] Int. Cl.⁷ .................................................. H01J 1/02
[52] U.S. Cl. ................................................................ 313/46
[58] Field of Search .................... 165/80.3, 184; 313/46, 18, 35, 36

[56] References Cited

U.S. PATENT DOCUMENTS

| | | | |
|---|---|---|---|
| 2,431,157 | 11/1947 | Zelinka | 313/45 X |
| 2,432,513 | 12/1947 | Depew | 313/45 X |
| 2,532,858 | 12/1950 | Rinia | 165/80.3 |
| 2,829,290 | 4/1958 | Van Warmerdam | 313/45 |
| 5,399,931 | 3/1995 | Roberts | 313/46 |

FOREIGN PATENT DOCUMENTS 2118300  9/1977  Japan ..................................... 165/184

*Primary Examiner*—Sandra O'Shea
*Attorney, Agent, or Firm*—Thomas E. Schatzel; Law Offices of Thomas E. Schatzel, A Prof. Corp.

[57] ABSTRACT

A heat sink for an arc lamp comprises a thin-wall copper strip that is brazed in pleated folds between inner and outer cylindrical rings to create cooling fins. The thickness of the material used for the cooling fins can therefore be exceedingly thin, e.g., 0.012 inches. The cylindrical rings act as fin supports and provide mechanical sturdiness. The thinness of the fin material allows a large number of fins to be included and the efficiency is increased thereby.

7 Claims, 3 Drawing Sheets

COMPACT HEAT SINKS FOR COOLING ARC LAMPS

BACKGROUND OF THE INVENTION

1. Field of the Invention

The invention relates generally to arc lamps and specifically to cooling such lamps with heat sinks when operated in excess of five hundred watts.

2. Description of the Prior Art

Short arc lamps provide intense point sources of light that allow light collection in reflectors for applications in medical endoscopes, instrumentation and projection. Short arc lamps are used in industrial endoscopes for the inspection of jet engine interiors.

A typical short arc lamp comprises an anode and a cathode positioned along the longitudinal axis of a cylindrical, sealed concave chamber that contains a gas pressurized to several atmospheres. U.S. Pat. No. 4,633,128, issued Dec. 30, 1986, to Rov D. Roberts, the present inventor, and Robert L. Miner, describes such a short arc lamp in which a copper sleeve member is attached to the reflecting wall to conduct heat from the reflecting wall through to the exterior wall and eventually to circulating ambient air.

The lamp illustrated in FIG. 2 of Roberts, et al., can be operated at one kilowatt. At such high power levels, the heat generated is conventionally dispersed with heat sinks. However, prior art heat sinks for in excess of five hundred watts are large and bulky.

Prior art heat sinks typically use aluminum extrusions that limit how thin the fins can be made. Extruding operations dictate fin thickness and spacing.

SUMMARY OF THE PRESENT INVENTION

It is therefore an object of the present invention to provide an improved heat sink for arc lamps operated at five hundred watts and greater.

It is another object of the present invention to provide a compact heat sink for arc lamps used in projection systems having low profile design requirements.

Briefly, an embodiment of the present invention is a heat sink for an arc lamp comprising a thin-wall copper strip that is brazed in pleated folds between inner and outer cylindrical rings to create cooling fins. The thickness of the material used for the cooling fins can therefore be exceedingly thin, e.g., 0.012 inches. The cylindrical rings act as fin supports and provide mechanical sturdiness. The thinness of the fin material allows a large number of fins to be included and the efficiency is increased thereby.

An advantage of the present invention is that a one-half inch high heat sink is provided for arc lamps that operate in excess of five hundred watts with a simple fan rated for fifty-five cubic feet per minute.

Another advantage of the present invention is that a compact heat sink is provided for arc lamps that is compact and efficient.

These and other objects and advantages of the present invention will no doubt become obvious to those of ordinary skill in the art after having read the following detailed description of the preferred embodiment which is illustrated in the various drawing figures.

IN THE DRAWINGS

DETAILED DESCRIPTION OF THE PREFERRED EMBODIMENTS

Figure 1:
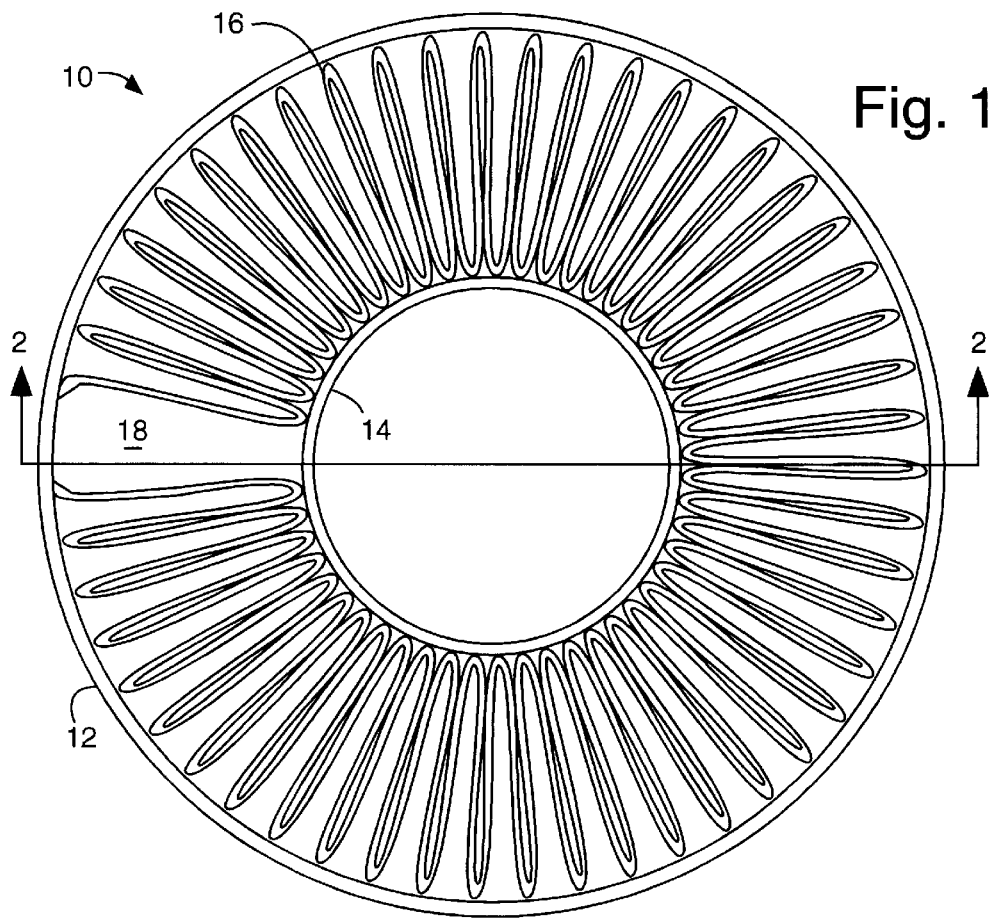
FIG. 1 is an end view of a heat sink embodiment of the present invention.
Figure 2:
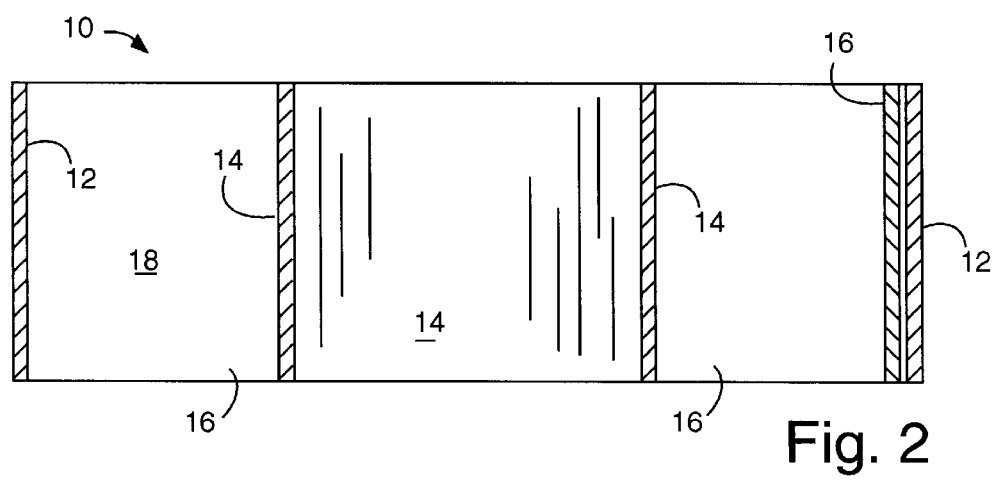
FIG. 2 is a cross-sectional view of the heat sink embodiment of the present invention taken along the line 2—2 in FIG. 1.
Figure 3:
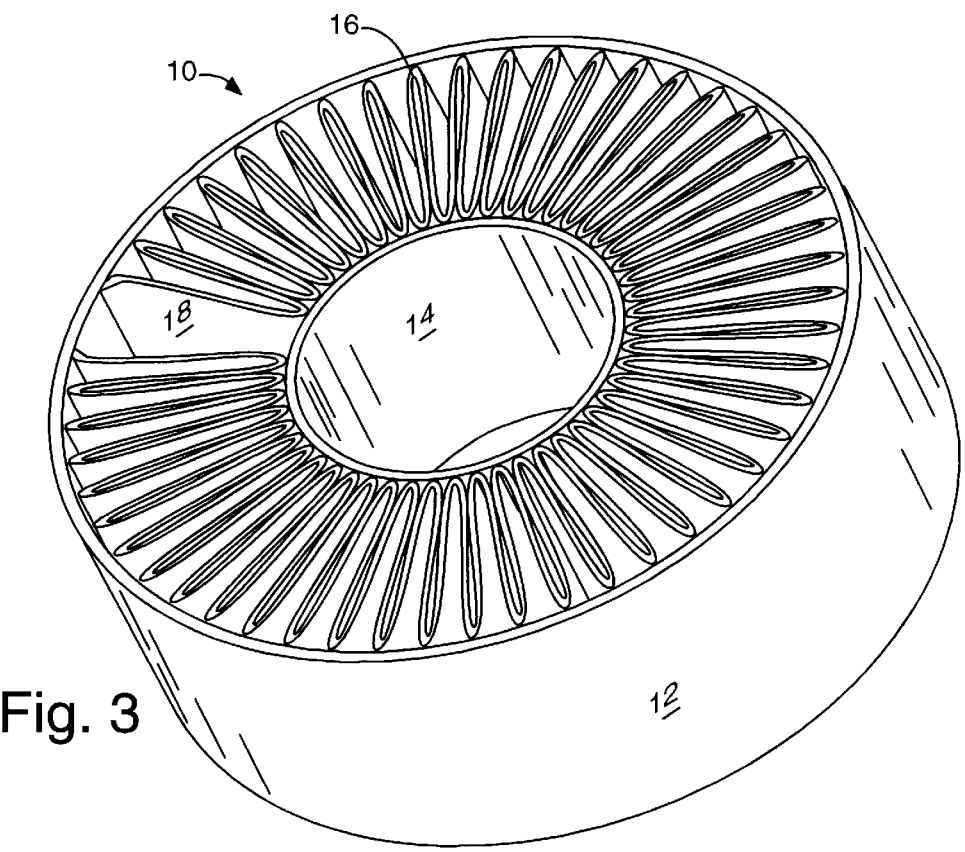
FIG. 3 is a perspective view of the heat sink of FIGS. 1 and 2.

FIGS. 1–3 illustrate a heat sink embodiment of the present invention, referred to herein by the general reference numeral 10. The heat sink 10 comprises an outer fin support 12, an inner fin support 14 and a pleated fin material 16. Preferably, the fin supports 12 and 14 and the fin material 16 comprise nickel-plated copper. The fin supports 12 and 14 are coaxial circular cylindrical rings and the fin material 16 is accordion-pleated into folds that are respectively cusil brazed at their outside and inside ends to the outer and inner fin supports 12 and 16. In one application, a device to be cooled, such as a five hundred watt arc lamp in a projection system, is snug-fit within the inner fin support 14 and cooling air is forced through the fins formed by pleating the fin material 16. A gap 18 provides access for fasteners to secure the inner fin support 14 to the device to be cooled and/or access for electrical connections. In a typical arc lamp application, the inner fin support 14 has a nominal diameter of 2.590 inches and the outer fin support 12 has a nominal diameter of 3.718 inches. Both fin supports 12 and 14, in such a case, have a height of 1.200 inches and are 0.032 inch thick copper material.

The heat sink 10 improves on the prior art by providing numerous cooling fins with very thin cross-sections. Preferably, the pleating of the fin material 16 provides as many as 130 total fins that are 0.012 inches thick, 0.500 inches along the axis of heat sink 10 and 1.20 inches radially between the fin supports 12 and 14. The gap 18 is preferably 0.400 inches wide.

Figure 4:
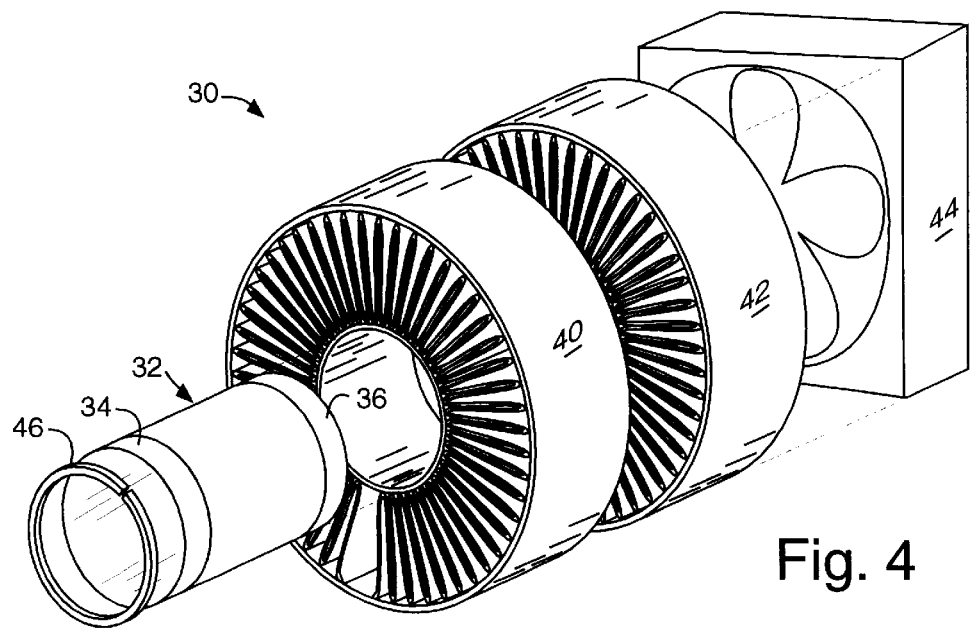
FIG. 4 is an exploded assembly diagram of an arc lamp and cooling system embodiment of the present invention that includes the heat sink of FIGS. 1–3.

FIG. 4 shows an arc lamp and cooling system embodiment of the present invention, referred to herein by the general reference number 30. The system 30 comprises a thousand watt arc lamp 32 with a cathode contact ring 34 and an anode contact ring 36. Both contact rings 34 and 36 provide for electrical connection and heat conduction for cooling. Due to the high operating voltages applied between contact rings 34 and 36, they are kept electrically separate and it is conventional to provide separate heat sinks for each. The system 30 further comprises a cathode heat sink 40 that fits snugly around the cathode contact ring 34, and an anode heat sink 42 that fits snugly around the anode contact ring 36. Both heat sinks 40 and 42 are similar to the heat sink 10 in FIGS. 1–3. A fan 44 provides a forced-air flow that passes through the fin areas of the heat sinks 40 and 42. A copper heat conduction flange 46 conducts heat from the front window of the arc lamp 32 directly to the cathode heat sink 40. The copper heat conduction flange 46 is brazed to the cathode heat sink 40. Given the efficiency of the heat sinks 40 and 42, the fan 44 preferably comprises a relatively quiet fifty-five cubic foot per minute (CFM) rating.

Figure 5:
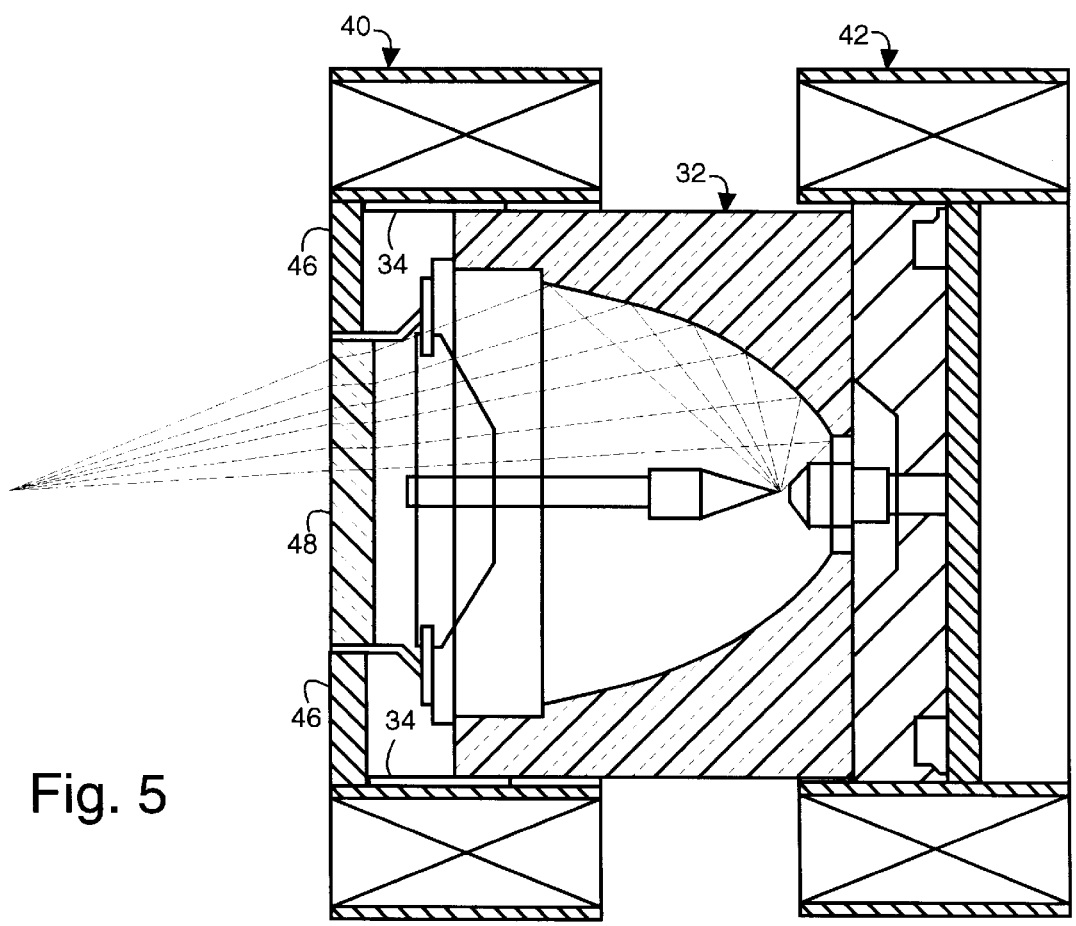
FIG. 5 is a cross-sectional diagram of the arc lamp of FIG. 4 and shows the heat transfer action of the copper heat conduction flange in greater detail.

FIG. 5 shows the heat transfer action of the copper heat conduction flange 46 in greater detail. It is advantageous for the arc lamp 32 to have a neck-down area that reduces to a window 48 that has a substantially smaller diameter than the diameter of the arc lamp 32. During operation, the window 48 sustains a large heat load by virtue of the radiation passing through it and its proximity to the lamp's arc discharge. Heat in the window is conducted through the flange 46 and out through the cathode ring 34 and the cathode heat sink 40. In a preferred embodiment, the flange 46 is 0.156 inches thick and its inside diameter makes a tight fit with the outside diameter of the window 48.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A heat sink, comprising:

an inner fin support of metal formed in a cylindrical ring and having a first axial length and having open and equal diameter first and second ends;

an outer fin support of metal formed in a cylindrical ring and coaxial with the inner fin support and having a second axial length about equal to said first axial length; and a single metal fin material in a rectangular strip having a width about equal to said first and second axial lengths and having a length that is accordion-pleated into folds and brazed at each crease to each of the inner and outer fin supports to form a plurality of fins parallel to an axis of both the inner and outer fin supports.

2. The heat sink of claim 1, wherein:

the inner and outer fin supports comprise nickel plated copper material approximately 0.032 inches thick; and the metal fin material comprises nickel plated copper material approximately 0.012 inches thick.

3. The heat sink of claim 1, wherein:

the metal fin material comprises as many as a hundred and thirty folds with a gap provided for access of fasteners and electrical connections.

4. An arc lamp and cooling system, comprising:

a cylindrical arc lamp with a pair of approximately-equal-diameter electrical connection and heat conduction bands for an anode and a cathode and that form outermost diameters of the arc lamp at opposite ends with a flat window in one of said ends;

an anode heat sink in contact with said anode electrical connection and heat conduction band;

a cathode heat sink in contact with said cathode electrical connection and heat conduction band; and a fan positioned at an anode end of the arc lamp for forcing an air flow through the anode and cathode heat sinks;

wherein each of the anode and cathode heat sinks comprises an inner fin support of metal formed in a cylindrical ring, an outer fin support of metal formed in a cylindrical ring and coaxial with the inner fin support and having approximately equal axial dimensions, and a metal fin material in a rectangular strip having a width approximately equal to said axial dimensions of said inner and outer fin supports, and accordion-pleated into folds and brazed to each of the inner and outer fin supports at a crease to form a plurality of fins parallel to an axis of both the inner and outer fin supports.

5. The system of claim 4, wherein:

said inner and outer fin supports comprise nickel plated copper material approximately 0.032 inches thick; and said metal fin material comprises nickel plated copper material approximately 0.012 inches thick.

6. The system of claim 4, wherein:

said metal fin material comprises as many as a hundred and thirty folds with a gap provided for access of fasteners and electrical connections to attach to the arc lamp.

7. The system of claim 4, wherein:

said window has a diameter substantially reduced from the diameter of the arc lamp itself; and the cathode heat sink includes a heat conduction flange that fits snugly around said window and inside the cathode heat sink and providing for conduction of heat from said window to the cathode heat sink.

\* \* \* \* \*